(12) United States Patent
Castillo et al.

(10) Patent No.: US 11,939,842 B2
(45) Date of Patent: Mar. 26, 2024

(54) FLUID SYSTEMS FOR EXPANDING SHAPE MEMORY POLYMERS AND REMOVING WATER-BASED FILTER CAKES

(71) Applicant: Baker Hughes Oilfield Operations LLC, Houston, TX (US)

(72) Inventors: Dorianne A. Castillo, Humble, TX (US); Sebastian Mesa, Bogota (CO); Diego Arias, Bogota (CO)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 17/962,700

(22) Filed: Oct. 10, 2022

(65) Prior Publication Data

US 2023/0113003 A1  Apr. 13, 2023

Related U.S. Application Data

(60) Provisional application No. 63/253,681, filed on Oct. 8, 2021.

(51) Int. Cl.
*E21B 37/00* (2006.01)
*C09K 8/44* (2006.01)
(Continued)

(52) U.S. Cl.
CPC .............. *E21B 37/00* (2013.01); *C09K 8/44* (2013.01); *C09K 8/54* (2013.01); *E21B 33/1208* (2013.01); *C09K 2208/32* (2013.01)

(58) Field of Classification Search
CPC ....... E21B 37/00; E21B 33/1208; C09K 8/44; C09K 8/52; C09K 8/524; C09K 8/528; C09K 8/54; C09K 2208/32
See application file for complete search history.

(56) References Cited

U.S. PATENT DOCUMENTS 9,051,805 B2  6/2015  Johnson et al.
9,097,108 B2  8/2015  Johnson et al.
(Continued)

FOREIGN PATENT DOCUMENTS

WO  2013160334 A1  10/2013

OTHER PUBLICATIONS

International Search Report and Written Opinion for International Application PCT/US2022/046017, International Filing Date Oct. 7, 2022, dated Jan. 31, 2023, 10 pages.

*Primary Examiner* — Angela M DiTrani Leff
(74) *Attorney, Agent, or Firm* — CANTOR COLBURN LLP

(57) ABSTRACT

A method includes disposing a device into a borehole in proximity to a subterranean formation where a filter cake has been formed adjacent thereto, the device comprising a support structure and a shape-memory article disposed at the support structure, the shape-memory article comprising a shape-memory polymer, wherein the device is disposed when the shape-memory article is in a compacted shape; exposing the shape-memory article to a fluid system to cause the shape-memory article to expand and conform to a surface of the borehole; exposing the filter cake to the fluid system; and removing the filter cake with the fluid system. The fluid system comprises a chelating agent, an activator, a non-emulsifier, and water or a brine.

18 Claims, 14 Drawing Sheets

(51) Int. Cl.
 *C09K 8/54* (2006.01)
 *E21B 33/12* (2006.01)

(56) References Cited

U.S. PATENT DOCUMENTS

| | | | |
|---|---|---|---|
| 9,441,458 B2 | 9/2016 | Carrejo et al. | |
| 2008/0169103 A1* | 7/2008 | Carbajal | C09K 8/52 166/300 |
| 2009/0078418 A1* | 3/2009 | Dusterhoft | C09K 8/506 166/295 |
| 2010/0216672 A1 | 8/2010 | Todd | |
| 2010/0323933 A1* | 12/2010 | Fuller | C09K 8/524 507/261 |
| 2011/0005773 A1* | 1/2011 | Dusterhoft | C09K 8/52 166/376 |
| 2012/0190593 A1 | 7/2012 | Soane et al. | |
| 2013/0161026 A1 | 6/2013 | Garza et al. | |
| 2014/0020910 A1* | 1/2014 | Falkner | B29C 61/06 166/381 |
| 2014/0332220 A1* | 11/2014 | Garza | C09K 8/508 166/311 |
| 2018/0037803 A1 | 2/2018 | Dahi Taleghani et al. | |
| 2019/0016947 A1 | 1/2019 | Mahmoud et al. | |
| 2019/0162050 A1* | 5/2019 | Fripp | C09K 8/508 |
| 2020/0131432 A1 | 4/2020 | Mahmoud et al. | |

* cited by examiner

FLUID SYSTEMS FOR EXPANDING SHAPE MEMORY POLYMERS AND REMOVING WATER-BASED FILTER CAKES

CROSS REFERENCE TO RELATED APPLICATION

This application claims the benefit of an earlier filing date from U.S. Provisional Application Ser. No. 63/253,681 filed Oct. 8, 2021, the disclosure of which is incorporated herein by reference in its entirety.

BACKGROUND

Shape-memory polymers (SMPs) are materials that regain their original shape from a deformed state when induced by an external stimulus, such as temperature change. Shape-memory polymers are useful for a variety of downhole applications, particularly those that require the sealing off a portion of a borehole or constricting the spacing around an element. Shape-memory polymers can also be used in sand control applications.

Articles can be formed from shape-memory polymers by heating and shaping the polymers at a temperature above their glass transition temperature, then subsequently fixing the shape by cooling to below the glass transition temperature.

During deployment, the shaped articles are heated above the glass transition temperature or slightly below the glass transition temperature to allow recovery of the original shape of the articles. In addition to temperature change, the shape memory effect can also be triggered by an electric or magnetic field, light, contact with a particular fluid or a change in pH.

Other than deploying shaped articles, drilling and completing a well prior to production may require many other steps or numerous trips of a drill string prior to production. It would thus be desirable to combine the deployment of shape-memory articles with other operations to reduce the number of trips into and out of the wellbore or to improve the efficiency of the drilling and completion operations.

BRIEF DESCRIPTION

A method comprising: disposing a device into a borehole in proximity to a subterranean formation where a filter cake has been formed adjacent thereto, the device comprising a support structure and a shape-memory article disposed at the support structure, the shape-memory article comprising a shape-memory polymer, wherein the device is disposed when the shape-memory article is in a compacted shape; exposing the shape-memory article to a fluid system to cause the shape-memory article to expand and conform to a surface of the borehole; exposing the filter cake to the fluid system; and removing the filter cake with the fluid system; wherein the fluid system comprises (i) a chelating agent, (ii) an activator, (iii) a non-emulsifier, and (iv) water or a brine.

A fluid system comprising, based on the total weight of the fluid system, (i) about 2 to about 20 wt. % of the chelating agent; (ii) about 1 to about 20 wt. % of the activator; (iii) about 0.01 to about 3 wt. % of the non-emulsifier; (iv) about 30 to about 90 wt. % of the brine; and (v) about 0.5 to about 3 wt. % of a corrosion inhibitor.

A fluid system comprising, based on the total weight of the fluid system: (i) about 5 to about 25 wt. % of an acid component comprising an acid, an acid precursor, or a combination of the acid and the acid precursor, and about 10 to about 40 wt. % of a chelating agent; (ii) about 1 to about 20 wt. % of an activator; (iii) about 0.01 to about 3 wt. % of a non-emulsifier; (iv) about 30 to about 90 wt. % of water or a brine; and (v) about 0.5 to about 3 wt. % of a corrosion inhibitor.

BRIEF DESCRIPTION OF THE DRAWINGS

The following description should not be considered limiting in any way. With reference to the accompanying drawings, like elements are numbered alike.

DETAILED DESCRIPTION

Figure 1:
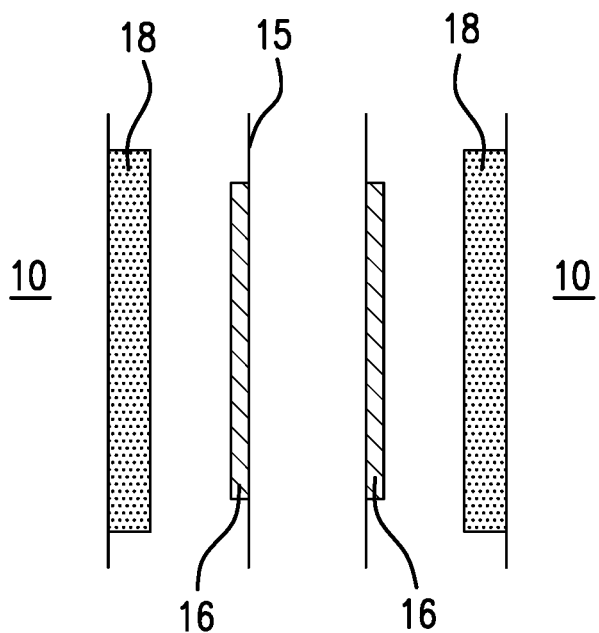
FIG. 1 is a schematic illustration of a device bearing a shape-memory article positioned in proximity to a subterranean formation having a filter cake formed adjacent thereto.

A filter cake is the residue deposited adjacent to a subterranean formation, when a slurry, such as a drilling fluid, a drill-in fluid, or a servicing fluid, is forced against a wellbore or subterranean formation under pressure. If a filter cake is not removed prior to or during completion of the well, a range of issues, such as completion equipment failures or impaired reservoir productivity, can arise when the well is put on production.

The inventors have developed a single fluid system that has the dual function of expanding shape-memory articles and removing filter cakes, in particular water-based filter cakes. Advantageously filter cakes can be removed after the shape-memory articles are deployed or fully expanded.

Carrier fluids have been used to expand shape-memory articles. However, known carrier fluids can have a relatively low flash point and do not allow for a complete and/or delayed filter cake removal.

Acids can be used to remove filter cakes. However, breaker compositions that contain just the acids can break a filter cake too fast such that the shape-memory articles are not fully expanded or deployed before the filter cake is removed.

The dual-function fluid systems disclosed herein are effective to remove filter cakes after the shape-memory articles are fully expanded. The fluid systems contain (i) a chelating agent; (ii) an activator; (iii) a non-emulsifier; (iv) water or a brine; and optionally (v) at least one of an acid component, a surfactant, a corrosion inhibitor or a viscosifier.

Examples of the chelating agents include, but are not limited to, ethylenediaminetetraacetic acid (EDTA) or a salt thereof such as sodium EDTA, disodium EDTA, diammonium EDTA, or tetraammonium EDTA; (N,N-dicarboxymethyl glutamic) acid (GLDA) or a salt thereof; aspartic acid N,N-diacetic acid (ASDA) or a salt thereof; methylglycine N,N-diacetic acid (MGDA) or a salt thereof such as trisodium dicarboxymethyl alaninate; etidronic acid (also referred to 1-hydroxyethane-1,1-diphosphonic acid or HEDP) or a salt thereof, diethylenetriamine pentaacetate (DTPA) or a salt thereof such as pentasodium diethylenetriaminepentaacetate; hydroxyethylethylenediaminetriacetic acid (HEDTA) or a salt thereof such as trisodium N-(hydroxyethyl)-ethylenediaminetriacetate; N-(2-hydroxyethyl) iminodiacetic acid (HEIDA) or a salt thereof; ethylenediamine-N, N'-disuccinic acid (EDDS) or a salt thereof; egtazic acid (EGTA) or a salt thereof; nitrilotriacetic acid (NTA) or salt thereof, cyclohexanediaminetetraacetic acid (CDTA) or a salt thereof, or a combination comprising at least one of the foregoing. Preferably the chelating agent is EDTA or a salt thereof.

As used herein, the activator is a material that is effective to reduce the glass transition temperature and/or rigidity of shape-memory polymers. Activators are normally liquids at room temperature. Certain known activators can have a low flash point and pose environmental concerns. Such activators can also be difficult to handle, particularly if used in large amounts. The activators used in the fluid systems disclosed herein have a higher flash point, and avoid any potential volatiles associated with certain activation agents. The activators used in the fluid systems described herein can have a flash point of greater than about 125° F.

Examples of the activator that can be used in the fluid systems include but are not limited to butanol, isobutanol, butoxy tri-glycol, 2-butoxyethanol, acetyl acetone, adipate, maleate, or diethylene glycol monoethyl acetate, or a combination comprising at least one of the foregoing. Other alcohols, glycols, ethoxylated alcohols, ethoxylated glycols, ethoxylated phenols, propoxylated alcohols, propoxylated glycols, propoxylated phenols, ethoxylated and propoxylated alcohols, ethoxylated and propoxylated glycols, ethoxylated and propoxylated phenols, n-butyl acetate, n-butyl propionate, n-propyl propionate, n-pentyl propionate, diethylene glycol, mono ethyl ether acetate, or triethylene glycol n-butyl may also be used. The ethoxylated and/or propoxylated alcohols can have a structure represented by the formula R—(OCH$_2$CH$_2$)$_m$(OCH$_2$CH$_2$CH$_2$)$_n$—OH, wherein R is a C$_{1-5}$ alkyl, C$_{1-3}$ alkyl, or ethyl, m is 0 to 8, and n is 0 to 8, provided that the sum of m and n is at least 1. Combinations of two or more activators can be used. In an aspect, the activator comprises butanol, isobutanol, or a combination thereof.

The non-emulsifier can be a combination comprising two or more, three or more, four or more, or five or more of the following non-emulsifier components: methanol; ethanol; isopropanol; 2-ethyl hexanol; an oxyalkylated aliphatic alcohol such as an ethoxylated aliphatic alcohol; an oxyalkylated alkylphenol; polyethylene glycol; or aromatic naphtha. The ethoxylated aliphatic alcohol can have a structure represented by the formula R—COCH$_2$CH$_3$, where R is a C$_6$-C$_{15}$ alkyl group or a C$_6$-C$_{10}$ alkyl group. The oxyalkylated alkylphenol can have a structure represented by the formula

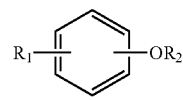

wherein R$_1$ is a C$_1$-C$_{10}$ alkyl group, and R$_2$ is a C$_1$-C$_5$, C$_2$-C$_4$, or C$_2$-C$_3$ alkyl group, or ethyl.

The non-emulsifier can be a combination comprising two to ten, three to ten, or four to ten of the non-emulsifier components as described herein. Without wishing to be bound by theory, it is believed that the non-emulsifier can help with lowering the surface tension of the formation thus allowing for better production. The non-emulsifier can also prevent oil from forming emulsions, but may not affect expansion of the shape memory material or the breakthrough of the filter cake.

The brine can include unsaturated up to saturated Ca, Na, K, Cs, or Zn halides or formate brine. Examples of the salts suitable for use in creating the brine include, sodium chloride, potassium chloride, calcium chloride, sodium bromide, calcium bromide, zinc bromide, sodium formate, potassium formate, cesium formate, or a combination comprising one of the foregoing. The density of the brine may range from about 8.4 pounds/gallon (lb/gal or ppg) to about 17 lb/gal (about 1 to about 2 kg/liter), about 8.4 lb/gal to about 14 lb/gal, about 8.4 lb/gal to about 12 lb/gal, or about 8.4 lb/gal to about 11 lb/gal. The density of the brine can also range from about 8 pounds/gallon to about 10 pounds/gallon or about 10 pounds/gallon to about 17 pounds/gallon.

The fluid system can further comprise an acid component. The acid component can include an acid, an acid precursor, or a combination thereof. The acids can be an inorganic acids including but are not limited to HCl, $H_2SO_4$, HF, $HNO_3$; binary acids or carboxylic acids including but are not limited to acetic acid, formic acid, lactic acid, citric acid, phthalic acid; or amino acids such as glutamic acid. Acid precursors include esters such as esters of acetic acid, esters of formic acid, esters of lactic acid, or esters of citric acid. Combinations of the acids and/or acid precursors can be used. As used herein, the acid component refers to an acid or acid precursor that does not form coordinate bonds with a metal. In other words, the acid component is not a chelating agent.

Optionally the fluid system further comprises a surfactant this is compositionally different from the non-emulsifier. In an aspect, the surfactant does not include the non-emulsifier components. The surfactant can include at least one of a non-ionic surfactant, an anionic surfactant, a cationic surfactant, or an amphoteric surfactant.

Examples of nonionic surfactants include alkyl polyglycosides, sorbitan esters, polyglycol esters, methyl glucoside esters, alcohol ethoxylates, or surfactin, or a combination comprising at least one of the foregoing. Alcohol ethoxylates are also referred to as alkyl ethoxylates, which are condensation products of aliphatic alcohols with from about 1 to about 25 moles, about 2 to 20 moles, or about 3 to about 20 moles of ethylene oxide. The alkyl chain of the aliphatic alcohol can either be straight or branched, primary or secondary, and generally contains from about 6 to about 22 carbon atoms. The alcohol ethoxylate nonionic surfactants can have a structure represented by the formula $R—(OCH_2CH_2)_m—OH$, wherein R is a $C_{6-22}$ alkyl group, and m is 1 to 25, 2 to 20, or 3 to 20.

The anionic surfactants include alkali metal alkyl sulfates, alkyl or alkylaryl sulfonates, linear or branched alkyl ether sulfates, linear or branched alkyl ether sulfonates, alcohol polypropoxylated and/or polyethoxylated sulfates, alcohol polypropoxylated and/or polyethoxylated carboxylates, alkyl or alkylaryl disulfonates, alkyl disulfates, sulfobetaines, alkyl sulphosuccinates, alkyl ether sulfates, linear or branched ether sulfates, or a combination comprising at least one of the foregoing.

In some embodiments, the anionic sulfonate, sulfate, and carboxylated surfactants have a hydrophobic chain of about 4 to about 40 carbon atoms, about 15 to about 30 carbon atoms, or about 20 to 25 carbon atoms. The anionic sulfonate surfactants can comprise an internal olefin or alcohol alkoxy sulfate. By "an internal olefin" is meant the molecule comprises an equilibrium mixture of double bonded isomers. Exemplary specific anionic sulfonate, sulfate, and carboxylated surfactants include, but are not necessarily limited to, internal olefin sulfonates, alcohol alkoxy sulfates, alcohol ethoxylated sulfates, alcohol propoxylated-ethoxylated sulfates, alkane sulfonates, alcohol propoxylated-ethoxylated sulfonated, alcohol polypropoxylated-ethoxylated carboxylated, alcohol ethoxylated carboxylated, alcohol ethoxylated sulfonated, or a combination comprising at least one of the foregoing.

Examples of cationic surfactants include quaternary ammonium compounds (e.g. polyglycol ether ammonium methyl chloride), arginine methyl esters, alkanolamines, alkylenediamines, or a combination comprising at least one of the foregoing.

Amphoteric surfactants (which include a cationic and anionic functional group on the same molecule) include, e.g., betaines, such as alkyl ammonium carboxylates (e.g., $[(CH_3)_3N^+CH(R)COO^-]$ or sulfonates (sulfo-betaines) such as $[RN^+(CH_3)_2(CH_2)_3SO_3^-]$, where R is an alkyl group. Examples include n-dodecyl-N-benzyl-N-methylglycine $[C_{12}H_{25}N^+(CH_2C_6H_5)(CH_3)CH_2COO^-]$, or N-allyl N-benzyl N-methyltaurines $[C_nH_{2n+1}N^+(CH_2C_6H_5)(CH_3)CH_2CH_2SO_3^-]$, or a combination comprising at least one of the foregoing.

The fluid systems can also contain a corrosion inhibitor such as an organic, inorganic, anodic or cathodic acid inhibitor. The corrosion inhibitor serves to reduce or prevent the corrosion of metal or metal-containing equipment. Examples of the corrosion inhibitor include quaternary ammonium compounds, sulfur compounds, isopropanol, methanol, alcohols ethoxylated, thiourea, formaldehyde, 1-phenylethanone, thio-alcohols, alkylpyridine benzyl chloride quaternary, oxyalkylated fatty alcohol, ethoxylated tall oil, acetophenone, aldehydes, or phosphates, or a combination comprising at least one of the foregoing.

A viscosifier is a component that increases the viscosity of the fluid systems. Examples of viscosifiers include but are not limited to hydratable polysaccharides, xanthan gum (which may or may not be crosslinked), urea thixotropes, amide ester thixotropes, cellulose, cellulose derivatives such as hydroxyethylcellulose (HEC); carboxymethylcellulose (CMC); hydroxypropylcellulose (HPC); and carboxymethylhydroxyethylcellulose (CMHEC), viscoelastic surfactants, or synthetic polymers such as polyacrylamides, polyacrylates, or diallyldimethylammonium chloride. A combination of two or more viscosifiers can be used.

The fluid systems can comprise (i) about 2 to about 40 wt. %, or about 5 to about 30 wt. % of the chelating agent; (ii) about 1 to 20 wt. %, about 1 to about 15 wt. %, about 1 to about 10 wt. %, about 3 to about 10 wt. %, or about 5 wt. % of the activator; (iii) about 0.01 to about 3 wt. %, about 0.01 to 1 wt. %, or about 0.01 to about 0.1 wt. % of the non-emulsifier; and (iv) about 30 to about 90 wt. %, about 40 to about 80 wt. %, or about 50 to about 70 wt. % of the water or brine, each based on the total weight of the fluid systems. The sum of the weights of the components in the fluid systems does not exceed 100 wt. %.

When the fluid systems do not comprise the acid component, the fluid systems can comprise (i) about 2 to about 20 wt. %, or about 2 to about 15 wt. %, or about 3 to about 12 wt. % of the chelating agent; (ii) about 1 to 20 wt. %, about 1 to about 15 wt. %, about 1 to about 10 wt. %, or about 3 to about 10 wt. % of the activator; (iii) about 0.01 to about 3 wt. %, about 0.01 to about 1 wt. %, or about 0.01 to about 3 wt. % of the non-emulsifier; and (iv) about 30 to about 90 wt. %, about 40 to about 80 wt. %, or about 50 to about 70 wt. % of the water or brine, each based on the total weight of the fluid systems. The sum of the weights of the components in the fluid systems does not exceed 100 wt. %.

When the fluid systems comprise both the acid component and the chelating agent, the fluid systems can comprise (i) about 10 to about 40 wt. %, or about 20 to about 40 wt. %, or about 15 to about 45 wt. % of the chelating agent, and about 5 to about 25 wt. % or about 10 to about 20 wt. % of the acid component; (ii) about 1 to 20 wt. %, about 1 to about 15 wt. %, about 1 to about 10 wt. %, or about 3 to about 10 wt. % of the activator; (iii) about 0.01 to about 3 wt. %, about 0.01 to 1 wt. %, or about 0.01 to about 0.1 wt. % of the non-emulsifier; and (iv) about 30 to about 90 wt. %, about 40 to about 80 wt. %, or about 50 to about 70 wt. % of the water or brine, each based on the total weight of the fluid systems. The sum of the weights of the components in the fluid systems does not exceed 100 wt. %.

In an aspect, the fluid systems further comprises a surfactant in an amount of about 1 to about 25 wt. % or about 15 to 25 wt. % based on the total weigh of the fluid systems. In the fluid systems comprise the surfactant, the fluid systems can comprise about 30 to about 70 wt. % of a brine having a density of about 10 to about 17 pounds/gallon. If the fluid systems do not contain the surfactant, the fluid systems can comprise about 30 to about 90 wt. % of a brine having a density of about 8 to about 10 pounds/gallon.

Optionally the fluid systems as described herein further comprise about 0.1 to 3 wt. % or about 0.5 to 2 wt. % of the viscosifier based on the total weight of the fluid systems. The fluid systems can also contain about 1 to 3 wt. % of the corrosion inhibitor based on the total weight of the fluid systems.

The fluid systems can be microemulsions. A microemulsion is a single optically isotropic and thermodynamically stable liquid solution.

The components of the fluid systems can be combined to form the fluid systems. Combining the components of the fluid systems can be accomplished in a vessel such as a mixer, blender, and the like. In some embodiments, fluid systems are injected without mixing, e.g. it is injected "on the fly."

The fluid systems can be used to expand shape-memory articles. Shape-memory articles comprise shape-memory polymers such as polyurethanes, polyamides, polyureas, polyvinyl alcohols, vinyl alcohol-vinyl ester copolymers, phenolic polymers, polybenzimidazoles, polyethylene oxide/acrylic acid/methacrylic acid copolymer crosslinked with N,N'-methylene-bis-acrylamide, polyethylene oxide/methacrylic acid/N-vinyl-2-pyrrolidone copolymer crosslinked with ethylene glycol dimethacrylate, polyethylene oxide/poly(methyl methacrylate)/N-vinyl-2-pyrrolidone copolymer crosslinked with ethylene glycol dimethacrylate, or a combination comprising at least one of the foregoing polymers. The shape-memory articles can be a foam. For sand control applications, the shape-memory articles are open cell foams. Bulk shape memory polymer can also be used.

In an embodiment, the shape-memory article is a polyurethane foam. The polyurethane foam is extremely tough and strong and is capable of being compressed and returned to substantially its original non-compressed shape. The polyurethane foam material can be made from one or more polyol components, such as, but not limited to, a polyether, polyester or polycarbonate-based di- or multifunctional hydroxylended prepolymer or polyol, and at least one isocyanate component, including, for example, a modified isocyanate (MI) or a modified diphenylmethane diisocyanate (MDI) based monomeric diisocyanate or polyisocyanate, as well as other additives such as blowing agents, molecular cross linkers, chain extenders, surfactants, colorants and catalysts.

The shape-memory polymers are able to remain in the deformed state even after applied mechanical force is removed, provided that the shape-memory polymers are not heated to a temperature above its glass transition temperature or slightly below its glass transition temperature. Accordingly, the shape-memory polymers can have a glass transition temperature that is about 20° C. or about 30° C. higher than the actual downhole deployment/application temperature to avoid premature expansion during run-in.

Shape-memory articles can be deployed or fully expanded in about 2 hours to about 40 hours, about 3 hours to about 30 hours, about 5 to 20 hours, or about 8 to 16 hours when the shape-memory articles are exposed to the fluid systems as described herein at a temperature of about 100 to 200° F. As used herein, "deployed" or "fully expanded" means that a shape-memory article returns to its original, manufactured shape or pre-deformed shape, or if constrained, the shape-memory article conforms to the new constrained shape. In an embodiment, a fully expanded or deployed shape-memory article means that the article has expanded and conformed to a surface of the borehole.

Advantageously, the fluid systems disclosed herein can remove filter cakes after the shape-memory articles are fully expanded. For example, filter cakes can be removed at least two hours or at least four hours after the shape-memory articles have expanded and conformed to the surface of a borehole.

As used herein, a filter cake can be a filter cake formed from well drill-in fluids, drilling fluids, and servicing fluids. The fluid system as disclosed herein is particularly suitable to remove water-based filter cake. Water-based filter cake can be formed from water-based mud or water-based drilling fluids. Water-based filter cake usually contains carbonates and silicates from the drilling mud and the material in the well bore. In an embodiment, the water-based filter cake contains less than about 10 wt. %, less than about 5 wt. %, or less than about 1 wt. % of oil or oil wettable components. Filter cakes can be formed adjacent a subterranean formation, for example, within a borehole, on a borehole wall, on a surface of a subterranean formation, or within a subterranean formation.

The fluid system can remove filter cakes in about 8 hours to about 60 hours, about 10 hours to about 50 hours, or about 16 to about 42 hours at a temperature of about 100 to 200° F. or about 130 to 175° F. After the filter cake is removed, the return production permeability is greater than 80% or greater than 90%.

Figure 2:
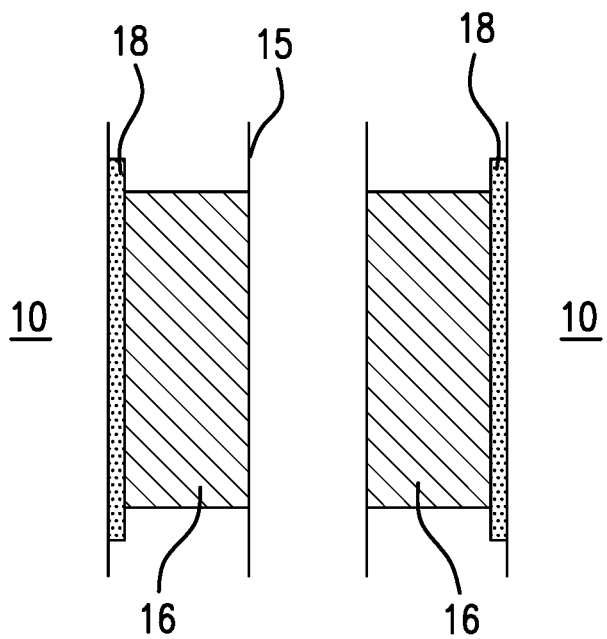
FIG. 2 is a schematic illustration of the device shown in FIG. 1 after the shape-memory article and the filter cake are exposed to a fluid system for a period of time to cause the shape-memory article to expand and conform to a surface of a borehole, and to partially remove the filter cake.
Figure 3:
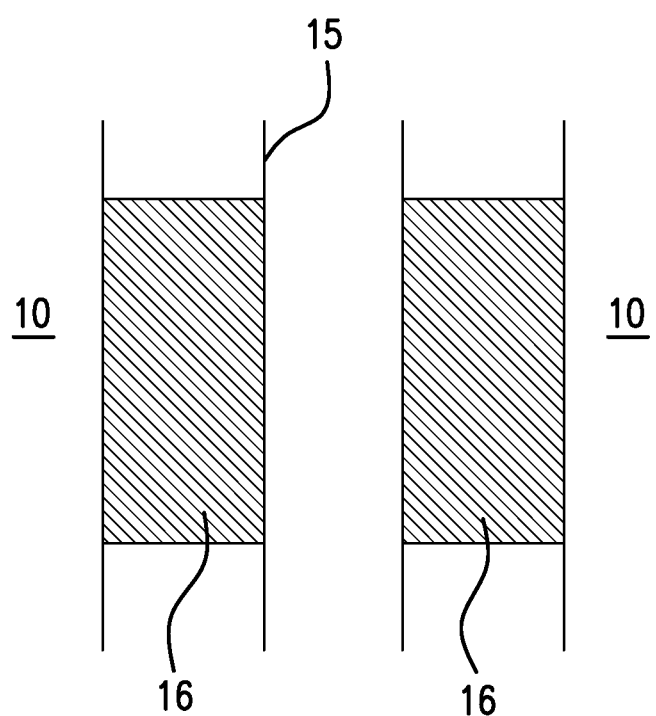
FIG. 3 is the schematic illustration of the device shown in FIG. 2 after the filter cake is exposed to the fluid system for an additional period of time to remove the filter cake.
Figure 4:
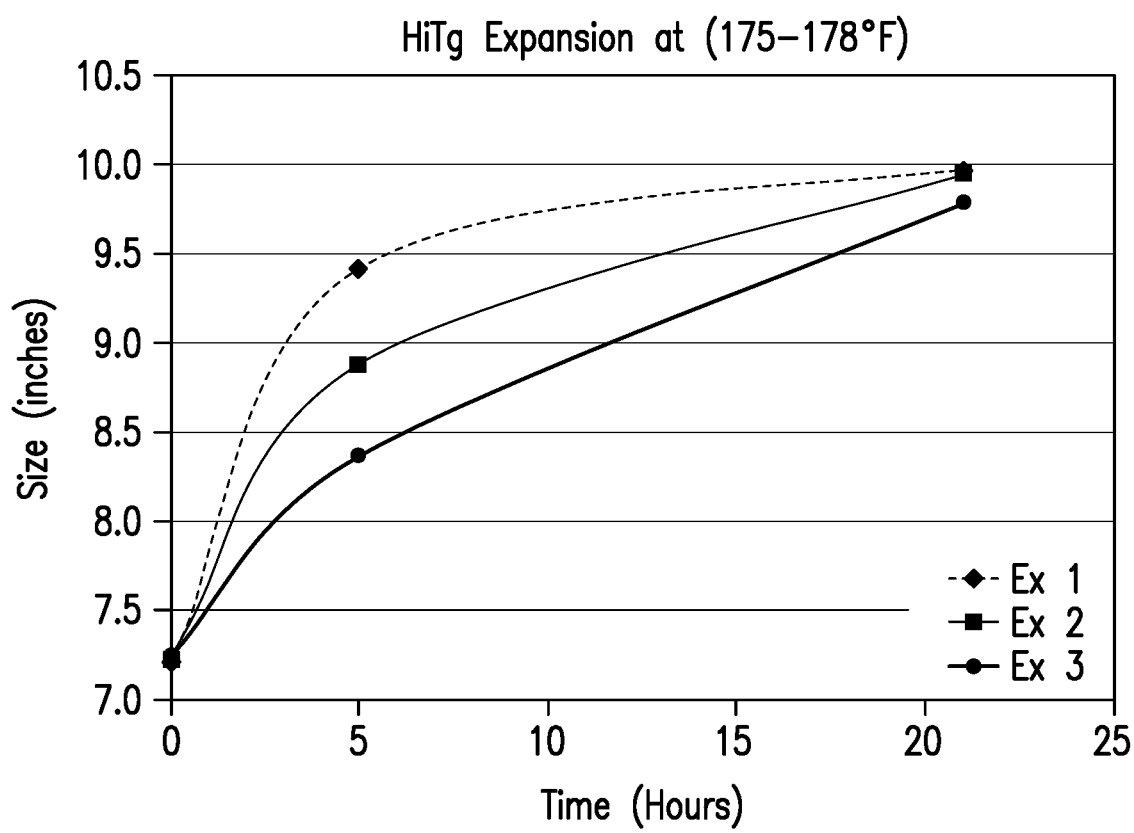
FIG. 4 is a graph of the height of a shape-memory coupon HiTg GeoFORM (inches) as a function of time (hours) when the coupon is exposed to the fluid systems of Ex 1-Ex 3 at 175° F.-178° F.
Figure 5:
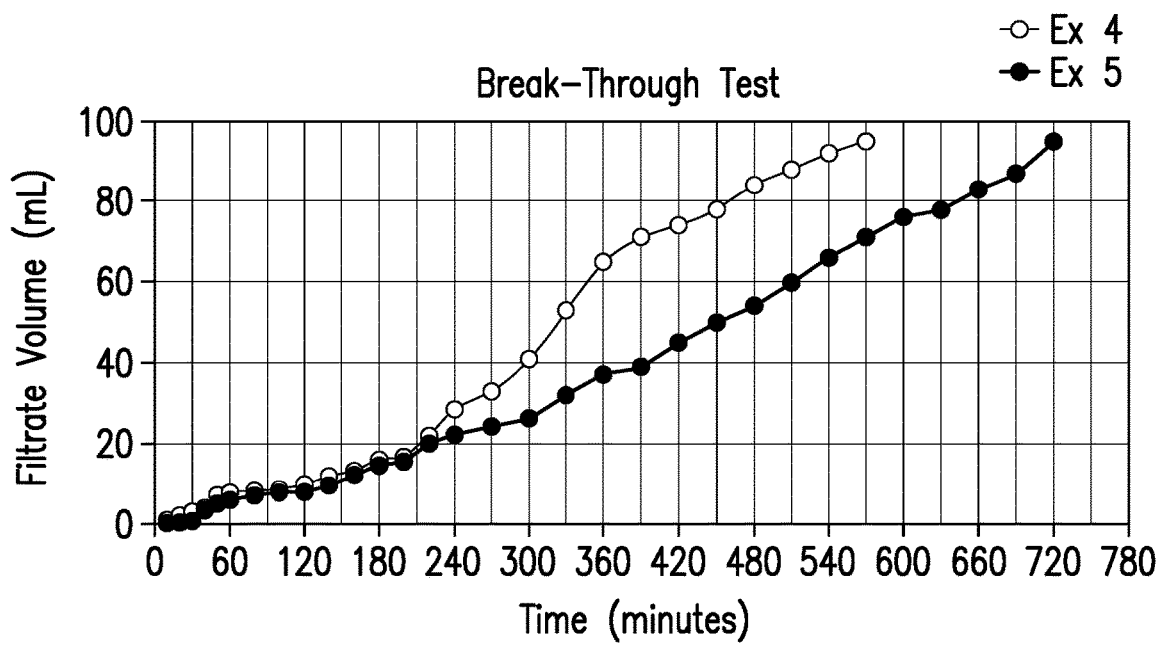
FIG. 5 is a graph of the height of a shape-memory coupon HiTg GeoFORM (inches) as a function of time (hours) when the coupon is exposed to the fluid systems of Ex 10-Ex 12 at 175° F.-178° F.
Figure 6:
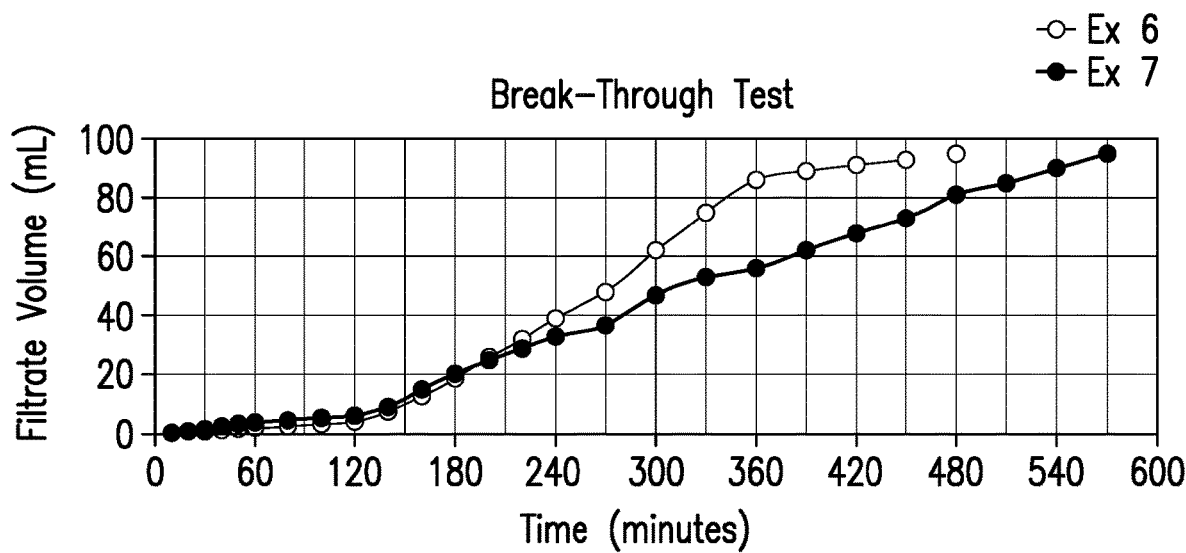
FIG. 6 is a graph of the height of a shape-memory coupon HiTg GeoFORM (inches) as a function of time (hours) when the coupon is exposed to the fluid system of Ex 13 at 175° F.-177° F.
Figure 7:
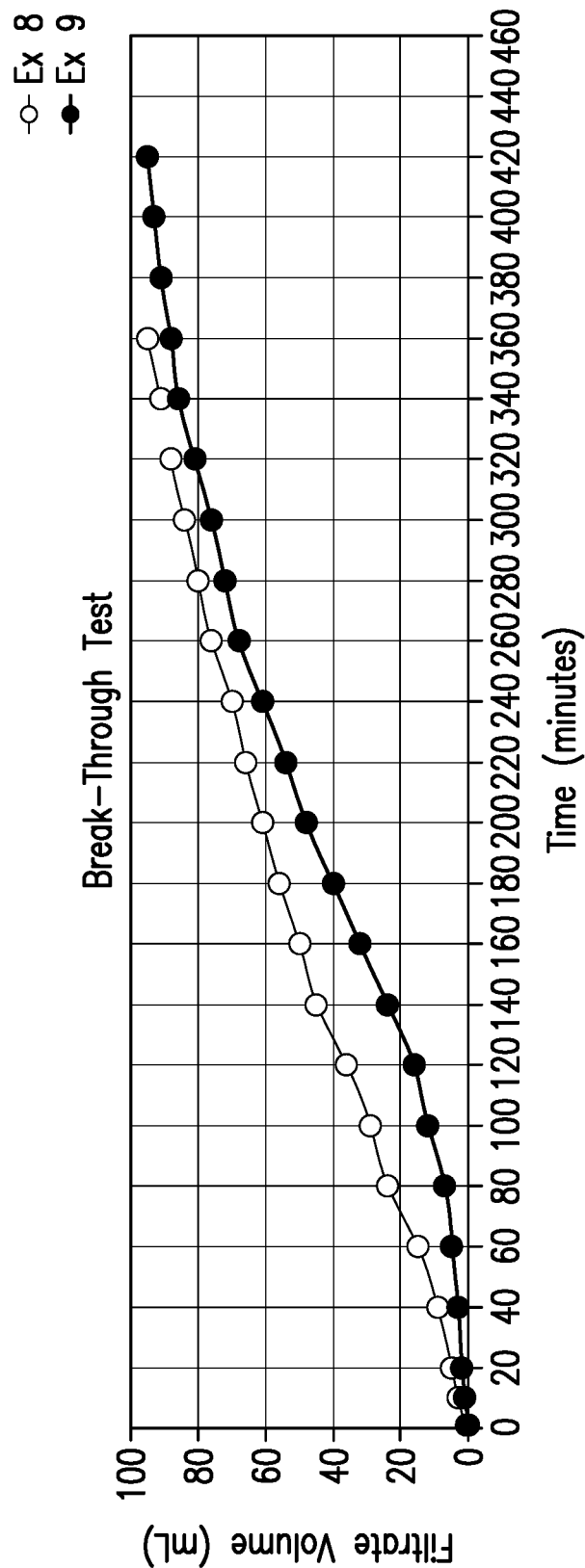
FIG. 7 is a graph of the height of a shape-memory coupon HiTg GeoFORM (inches) as a function of time (hours) when the coupon is exposed to the fluid system of Ex 14 at 175° F.
Figure 8:
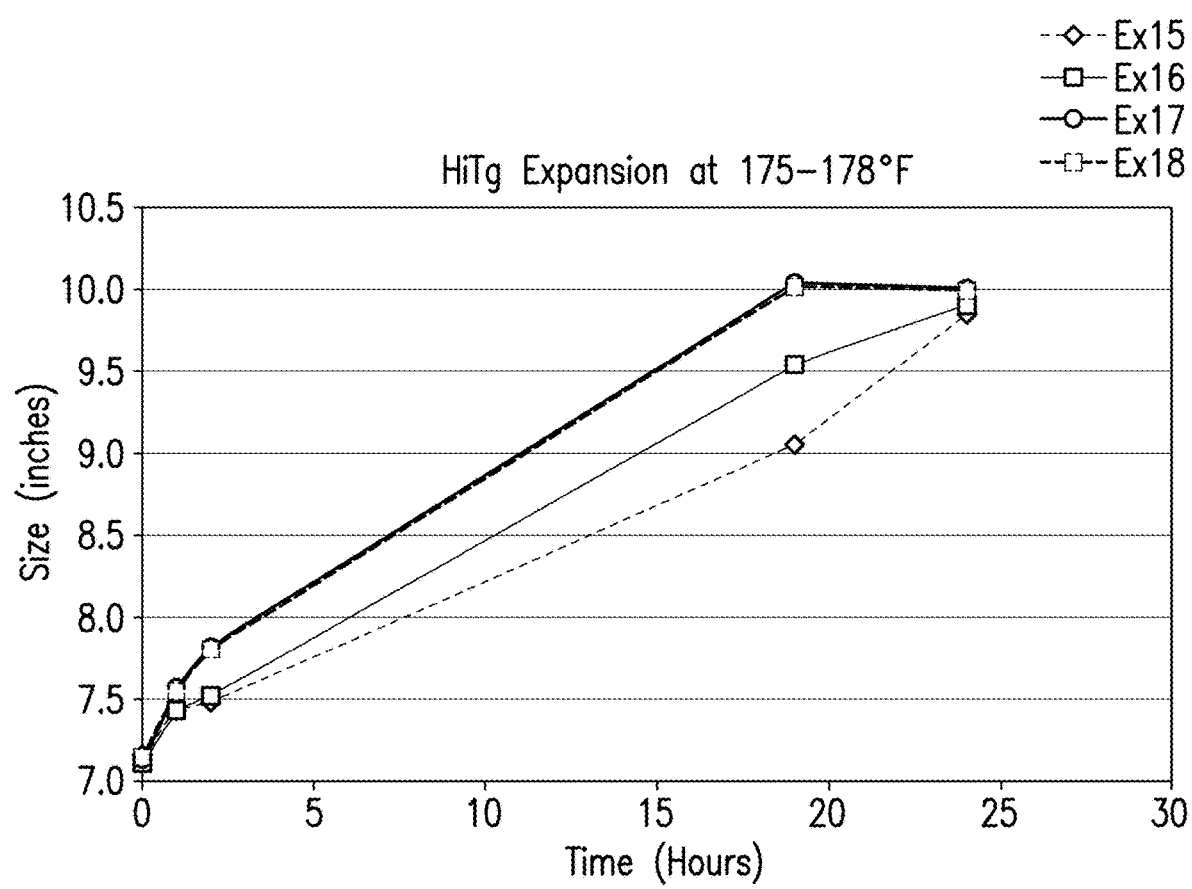
FIG. 8 is a graph of the height of a shape-memory coupon HiTg GeoFORM (inches) as a function of time (hours) when the coupon is exposed to the fluid systems of Ex 15-Ex 18 at 175° F.-178° F.
Figure 9:
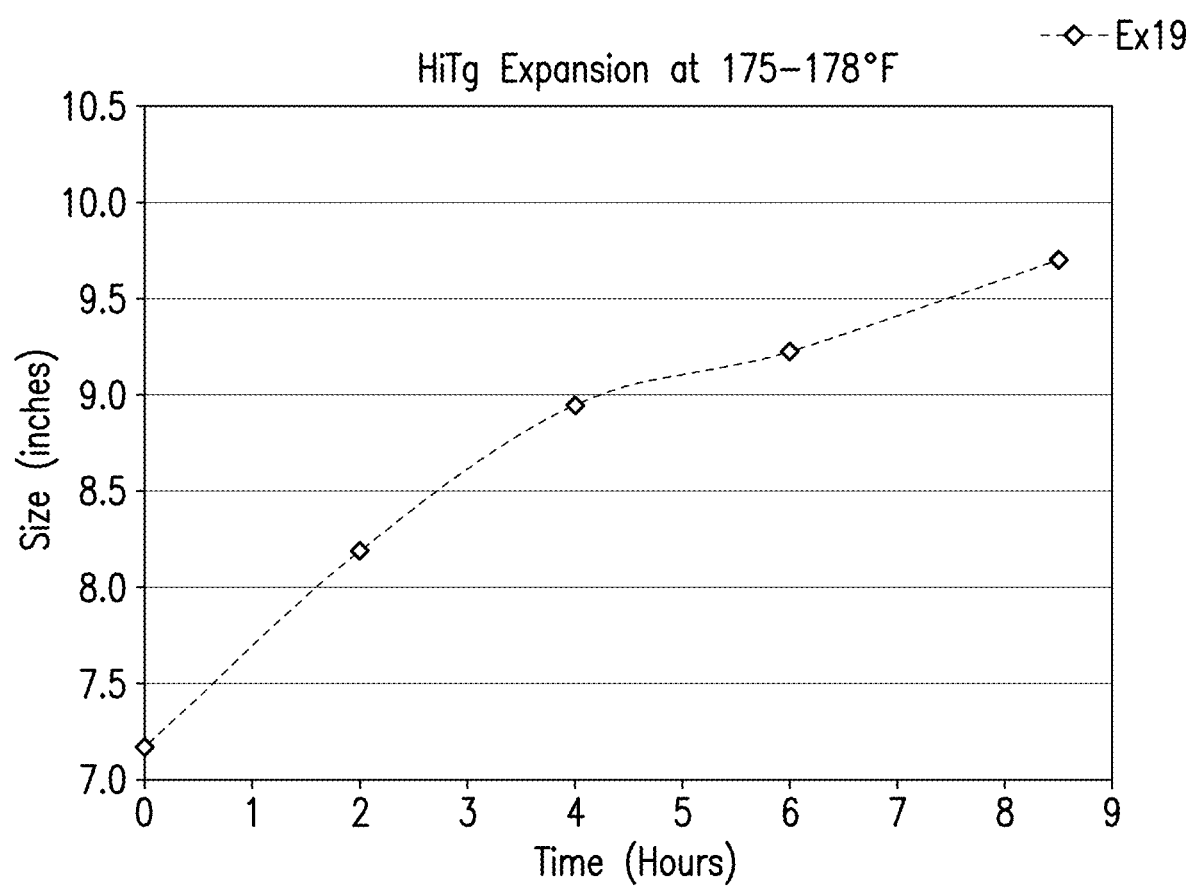
FIG. 9 is a graph of the height of a shape-memory coupon HiTg GeoFORM (inches) as a function of time (hours) when the coupon is exposed to the fluid system of Ex 19 at 175° F.-178° F.
Figure 10:
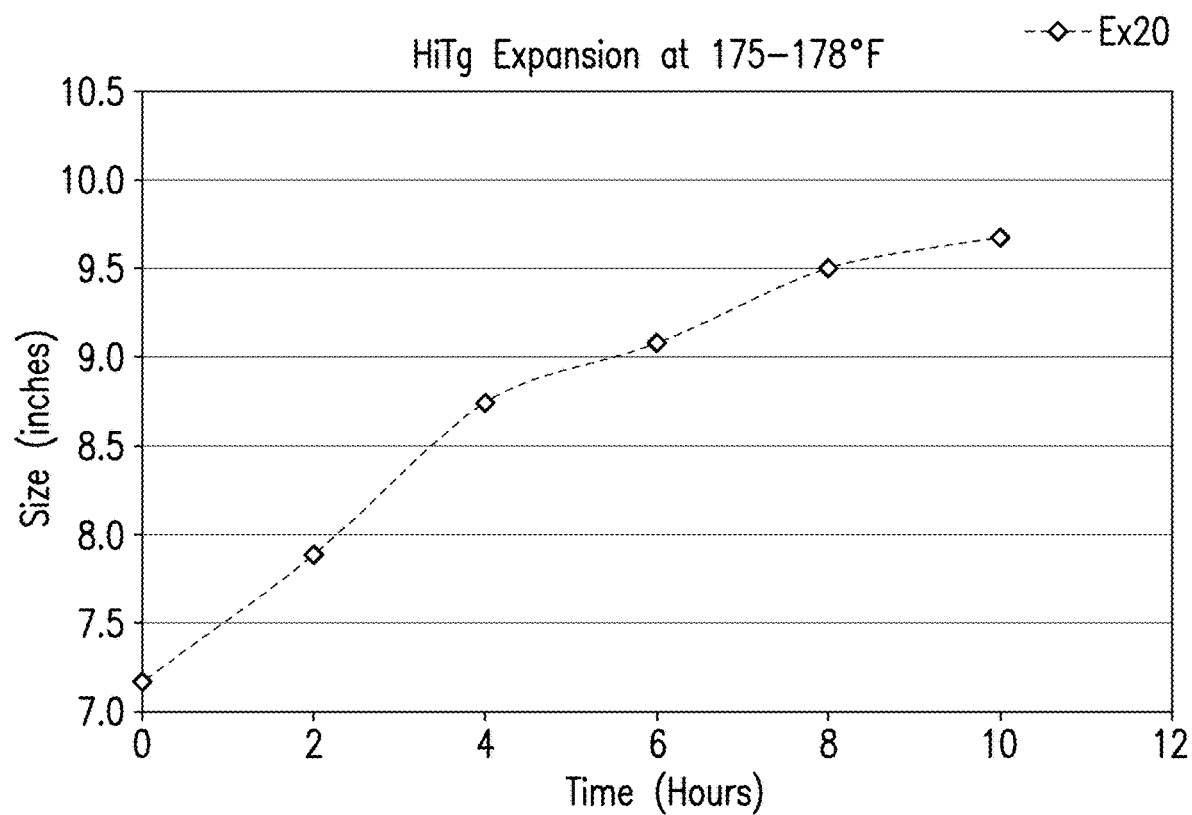
FIG. 10 is a graph of the height of a shape-memory coupon HiTg GeoFORM (inches) as a function of time (hours) when the coupon is exposed to the fluid system of Ex 20 at 175° F.-178° F.
Figure 11:
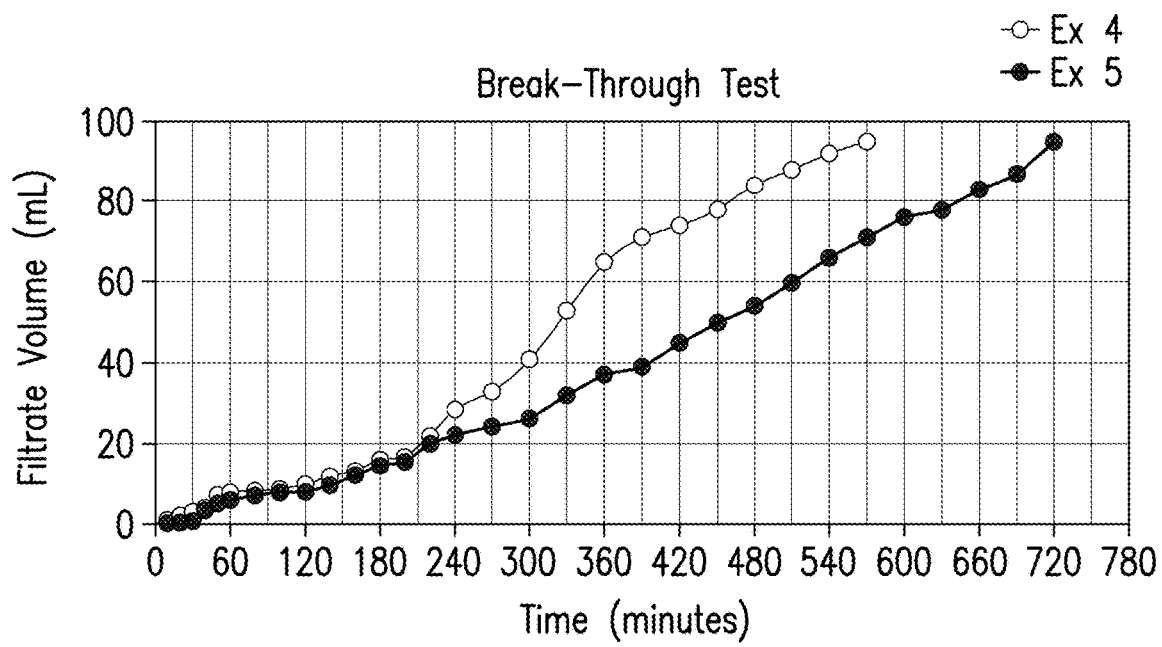
FIG. 11 is a graph of the filtrate volume (millimeters, mL) as a function of time (minutes) when a water-based filter cake is exposed to the fluid systems of Ex 4 and Ex 5 at 175° F.
Figure 12:
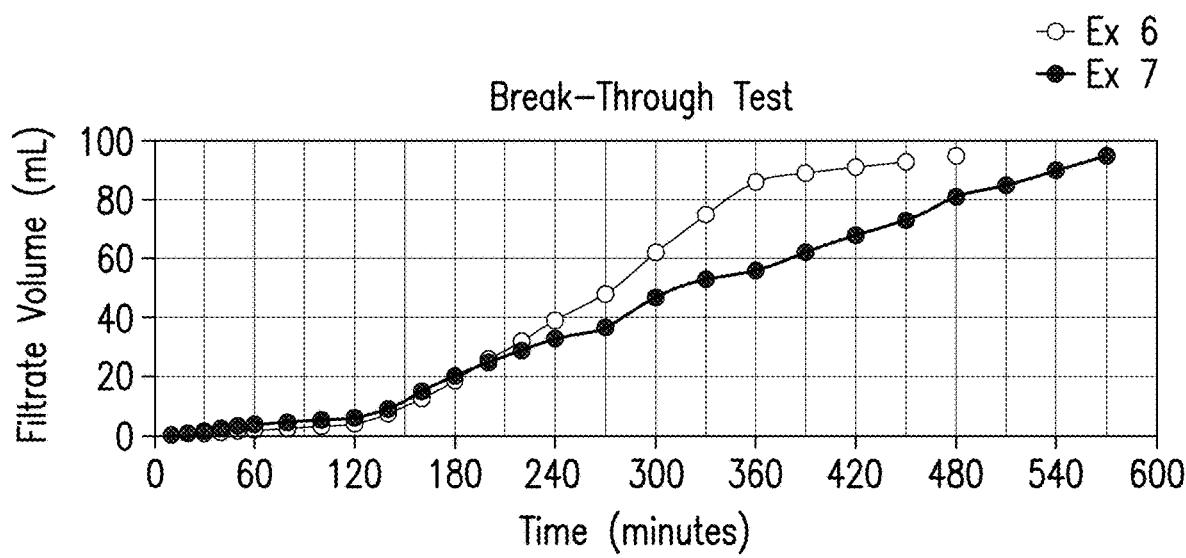
FIG. 12 is a graph of the filtrate volume (millimeters, mL) as a function of time (minutes) when a water-based filter cake is exposed to the fluid systems of Ex 6 and Ex 7 at 175° F.
Figure 13:
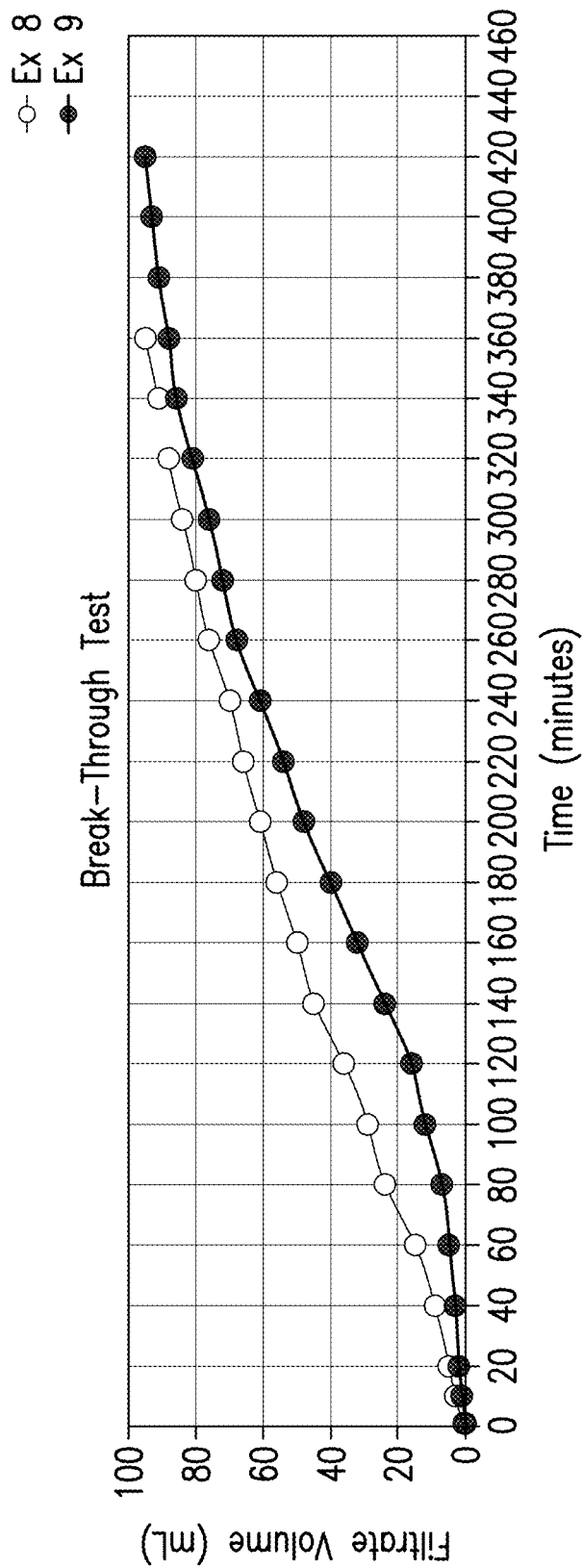
FIG. 13 is a graph of the filtrate volume (millimeters, mL) as a function of time (hours) when a water-based filter cake is exposed to the fluid systems of Ex 8 and Ex 9 at 175° F.
Figure 14:
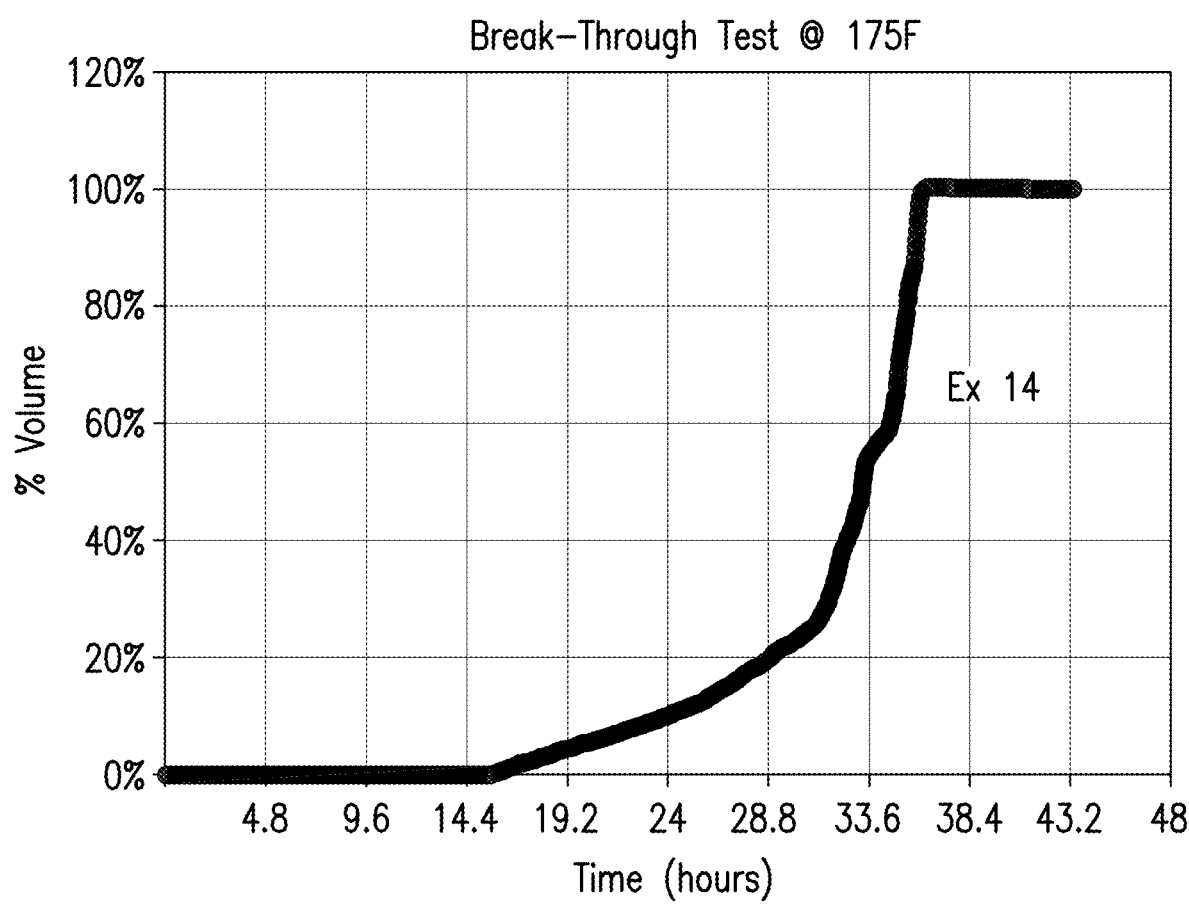
FIG. 14 is a graph of the flow back percentage (volume %) as a function of time (hours) when a water-based filter cake is exposed to the fluid system of Ex 14 at 175° F.
Figure 15:
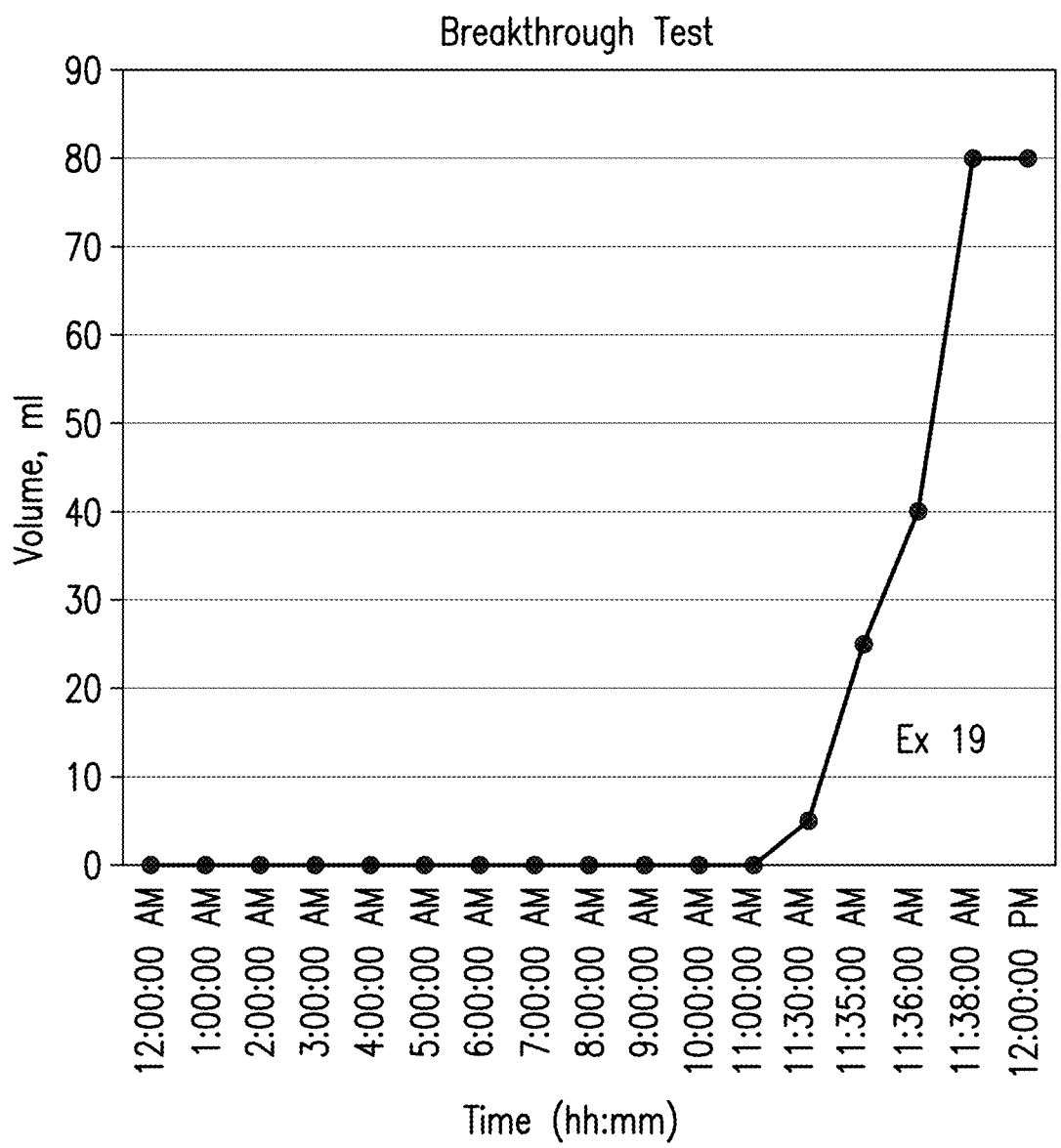
FIG. 15 is a graph of the filtrate volume (millimeters, mL) as a function of time (hour:minute, hh:mm) when a water-based filter cake is exposed to the fluid system of Ex 19 at 175° F.
Figure 16:
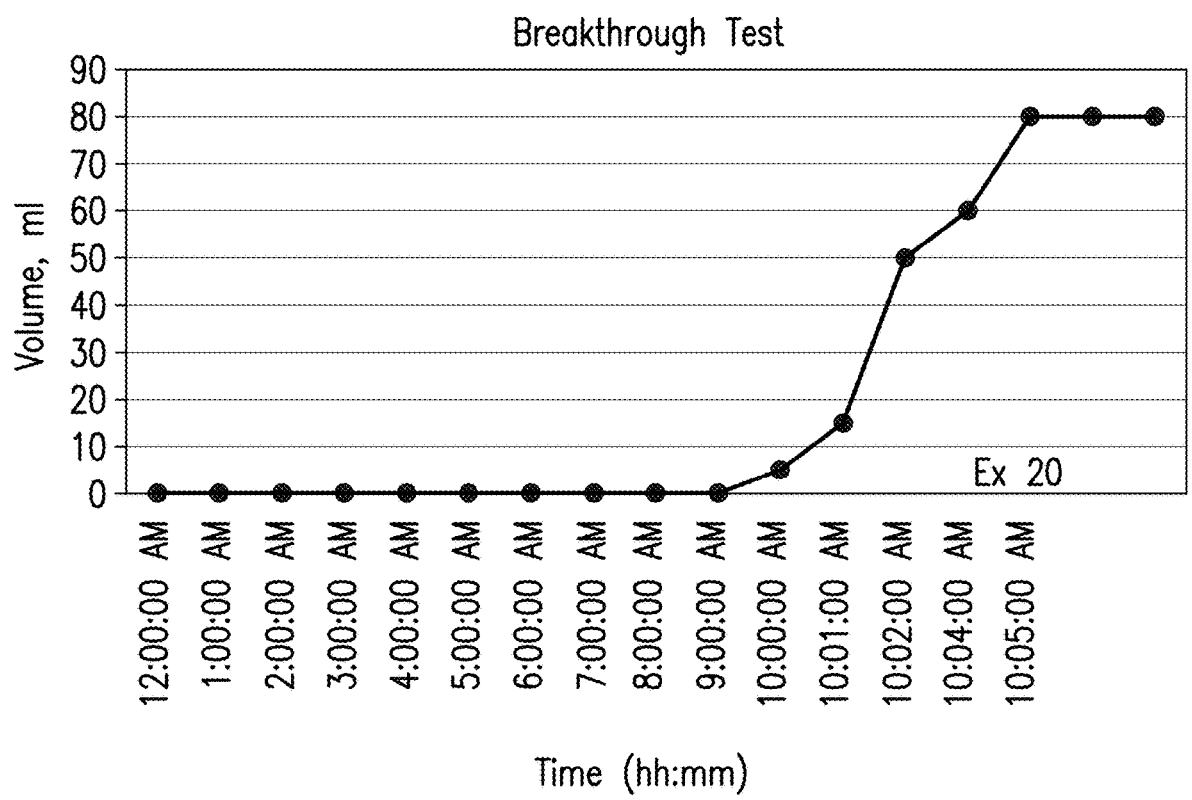
FIG. 16 is a graph of the filtrate volume (millimeters, mL) as a function of time (hour:minute, hh:mm) when a water-based filter cake is exposed to the fluid system of Ex 20 at 175° F.

An efficient method of installing a downhole article comprising a shape-memory polymer is disclosed. Referring to FIGS. 1-3, the method includes disposing a device into a borehole in proximity to a subterranean formation (10) where a filter cake (18) has been formed adjacent thereto, the device comprising a support structure (15) and a shape-memory article (16) disposed at the support structure, the shape-memory article comprising a shape-memory polymer, wherein the device is disposed when the shape-memory article is in a compacted shape; exposing the shape-memory article to a fluid system as described herein to cause the shape-memory article to expand and conform to a surface of a borehole; exposing the filter cake to the fluid system; and removing the filter cake with the fluid system. The support structure can be a tubular member such as a perforated base pipe. As illustrated in these figures, filter cake (18) is removed after the shape-memory article (16) has expanded and conformed to a surface of the borehole.

The shape-memory articles are run into the wellbore in a deformed shape or position. Deformed shape-memory articles can be made by compressing or stretching the shape-memory polymers with a mechanical force at a temperature greater than the glass transition temperature of the polymer. While still in the deformed state, the material is cooled down to a temperature below its glass transition temperature. The shape-memory polymers remain in the deformed shape induced on it after manufacture at surface temperature or at wellbore temperature during run-in. After the downhole article comprising the shape-memory polymer is placed at the desired location within the well, it is contacted with a fluid system as described herein. The fluid system reduces the glass transition temperature of the shape-memory polymer and/or reduces the rigidity of the polymer thus facilitating the deployment of the shape-memory article.

In an embodiment, the shape-memory article is deployed to conform to a surface of the borehole. In other words, the shape-memory article expands or deploys to fill the available space up to the borehole wall. The borehole wall will limit the final, recovered shape of the shape-memory article and not permit it to expand to its original, geometric shape. In this way, the recovered or deployed shape-memory article will perform the desired function within the wellbore.

In some embodiment, while introducing the shape-memory article downhole, the article is contacted with a first fluid comprising water, brine, hydrocarbon, or a combination comprising at least one of the foregoing. If the shape-memory article absorbs the first fluid, it is preferably to inject the fluid systems at a sufficient pressure to displace the first fluid in the shape-memory polymer with the fluid systems.

When the shape-memory article is a polymer foam, as a result of the shape memory polymer being expanded to its set position, the open cell porous shape memory foam can prevent production of undesirable solids from the formation and allow only desired hydrocarbon fluids to flow through the shape memory foam. The foam cell pore size, size distribution and cell openness may be adjusted by formulating different components and by controlling processing conditions in such a way that only desired hydrocarbon fluids are allowed to flow through and undesirable solids from the formation are prevented from being produced.

Alternatively, the shape memory polymer may be designed to prevent fluids as well as solids from passing therethrough, in which case the tool is a packer or other isolation device. Thus, suitable downhole devices used in the methods described herein include an expansion tool, a screen, a packer, and an isolation plug.

The following is a description of examples of fluid systems that can be used to deploy shape-memory polymers and to remove filter cakes. It is noted that the components of the fluid systems and the amounts thereof are not limited to the specific examples.

EXAMPLES

Various fluid systems were prepared by combining, if used, disodium ethylenediaminetetraacetic acid as the chelating agent, butanol (activator) or isobutanol (activator 2) as the activator, NE-940 commercially available from Baker Hughes as the non-emulsifier, a brine, and acetic acid. The amounts of the components are shown in Tables 1-4.

Expansion Test

The expansion rates of shape-memory polymers in the fluid systems were evaluated. GeoFORM HiTg coupons were made from a shape-memory polyurethane having a Tg ranging from 142-148° C. The expansion rates were tested by exposing a compressed GeoFORM HiTg coupon of a known size to the fluid system to be tested. The jar with the fluid system and the GeoFORM HiTg coupon was placed in a pre-heated water bath at the desired temperature. The coupon was measured over time. Graphs of the height of the coupon (inch) as a function of time (hour) after exposed to fluid systems of Table 1 and Table 2 are shown in FIGS. 4-10.

TABLE 1

| Component | Unit | Ex 1 | Ex 2 | Ex 3 | Ex 10 | Ex 11 | Ex 12 | Ex 13 |
|---|---|---|---|---|---|---|---|---|
| Brine (NaCl) | ppg | 8.5 | 8.5 | 8.5 | 8.5 | 8.5 | 8.5 | |
| Brine (KCl) | ppg | | | | | | | 9 |
| Chelating agent | wt % | 10 | 10 | 10 | 5 | 5 | 5 | 5 |
| Activator | wt % | 5 | 4 | 3 | 5 | 4 | 3 | 7 |
| Non-emulsifier | wt % | 0.05 | 0.05 | 0.05 | 0.05 | 0.05 | 0.05 | 0.05 |

TABLE 2

| Component | Unit | Ex 14 | Ex 15 | Ex 16 | Ex 17 | Ex 18 | Ex 19 | Ex 20 |
|---|---|---|---|---|---|---|---|---|
| Brine (KCl) | ppg | 8.5 | 8.5 | 8.5 | 8.5 | 8.5 | 9 | 9 |
| Chelating agent | wt % | 30 | 5 | 8 | 5 | 8 | 30 | 30 |
| Activator | wt % | 6 | | | 6 | 6 | | |
| Activator 2 | wt % | | 6 | 6 | | | 7 | 7 |
| Non-emulsifier | wt % | | | | | | | 0.02 |
| Acetic acid | wt % | 15 | | | | | 8 | 8 |

Breakthrough Test

The breakthrough time refers to the time at which the fluid system breaks through a filter cake and an aloxite disk. The breakthrough test started by building a filter cake by adding a drilling mud to a double-ended cell that contained a new mercury 20-micron disk. The cake was built at 175° F., under 500 psi constant pressure for four hours. After four hours, the cell was cooled down. The drilling fluid was decanted, and the fluid system to be tested was added to the cell. The cell then was placed back into a jacket, with an open bottom stem, to run the test at 175° F. under 200 psi constant pressure. The breakthrough time was captured by using a HTHP equipment and balances connected to a computer program (RSI program).

The flow back percent can be calculated via the following equation:

Flow back %=(Initial flow back=Average time recorded for 100 mL of a mineral oil to flow back with a clean disk)/(Final flow back=Average time recorded for 100 mL of a mineral oil to flow back after 24 hours soaking test)×100%.   (Equation 1)

The test was initiated by assembling a 500 mL double-ended cell with a screen assembly, a GeoFORM coupon, if used, and a new mercury 20-micron aloxite disk. A water based mud was pumped through the cell system at 5 psi and collected in production mode. The amount of time that took to collect 100 mL of the mineral oil was recorded. After repeating the collection three times, the average of the readings was calculated and the initial flow back time was obtained.

The cell was empty out of the mineral oil, and the screens and GeoFORM were removed. The fluid system was added to the cell, and the cell was soaked at 175° F. and a pressure of 200 psi for 24 hours. After cooling, the fluid system was removed from the cell. The screen stack assembly and GeoFORM coupon, if used, were placed in the cell on top of the aloxite disk. The cell assembly was closed again and a water based mud was pumped through the cell system at 5 psi and collected in production mode. The amount of time that took to collect 100 mL of the mineral oil was recorded. After repeating the collection three times, the average of the readings and the final flow back the time were calculated. The flow back percent was calculated according to equation 1.

The breakthrough test results of the fluid systems of Table 3 and fluid systems Ex 14, Ex 19, and Ex 20 of Table 2 are shown in FIGS. 11-16.

TABLE 3

| Component | Unit | Ex 4 | Ex 5 | Ex 6 | Ex 7 | Ex 8 | Ex 9 |
|---|---|---|---|---|---|---|---|
| Brine (NaCl) | ppg | 8.5 | 8.5 | 8.5 | 8.5 | 8.5 | 8.5 |
| Chelating agent | wt % | 5 | 5 | 8 | 8 | 10 | 10 |
| Activator | wt % |  | 5 |  | 5 |  | 5 |

Stability Test

Additional fluid systems were prepared, and the amounts of the components are shown in Table 4.

TABLE 4

| Component | Unit | Ex 21 | Ex 22 | Ex 23 | Ex 24 | Ex 25 | Ex 26 | Ex 27 | Ex 28 | Ex 29 |
|---|---|---|---|---|---|---|---|---|---|---|
| Brine (KCl) | ppg | 8.5 | 8.5 | 8.5 | 8.5 | 8.5 | 8.5 | 8.5 | 8.5 | 8.5 |
| Chelating agent | wt % | 5 | 5 | 5 | 5 | 5 | 5 | 5 | 5 | 5 |
| Activator | wt % | 5 | 6 | 7 | 5 | 6 | 7 | 5 | 6 | 7 |
| Non-emulsifier | wt % | 0.05 | 0.05 | 0.05 |  |  |  | 0.05 | 0.05 | 0.05 |
| NaHCO₃ | lpb |  |  |  |  |  |  | 0.5 | 0.5 | 0.5 |

The fluid systems 21-29 were homogeneous after 24 hours. The results indicate that the fluid systems containing a brine, a chelating agent, an activator, and a non-emulsifier are stable, regardless whether sodium bicarbonate is present or not.

Compatibility Test

Figure 17:
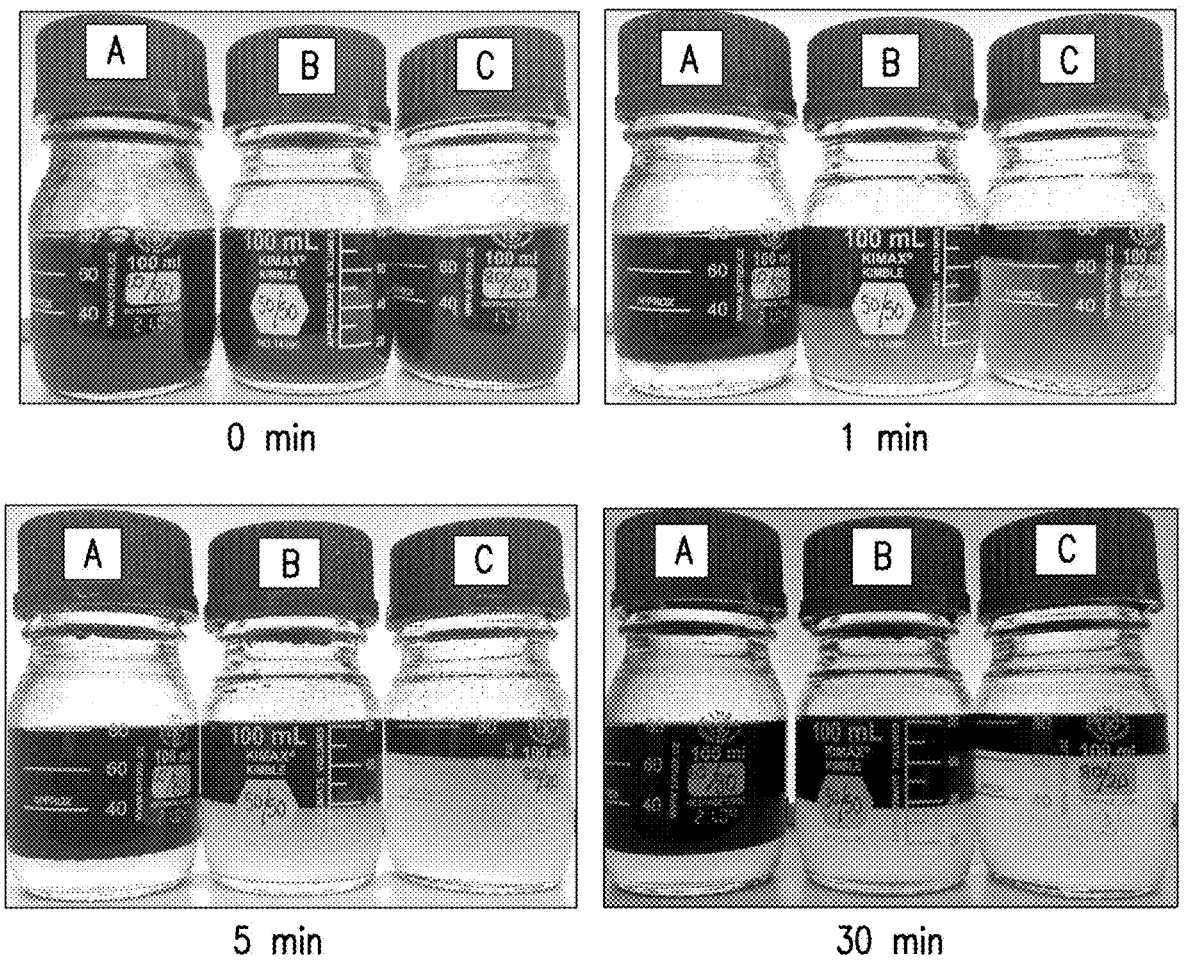
FIG. 17 shows pictures of Samples A, B, and C at time 0 minute, 1 minute, 5 minutes, and 20 minutes after mixing.

Samples A, B, and C were prepared by mixing a crude oil with the fluid system of Ex 20 in a volume ratio of 20:80 (Sample A), 50:50 (Sample B), and 80:20 (Sample C) respectively. Pictures of Samples A, B, and C were taken at 0 minute, 1 minute, 5 minutes, and 30 minutes after mixing. The results are shown in FIG. 17. The figure shows how the fluid system breaks the emulsion formed.

Set forth below are various embodiments of the disclosure.

Aspect 1. A method comprising: disposing a device into a borehole in proximity to a subterranean formation where a filter cake has been formed adjacent thereto, the device comprising a support structure and a shape-memory article disposed at the support structure, the shape-memory article comprising a shape-memory polymer, wherein the device is disposed when the shape-memory article is in a compacted shape; exposing the shape-memory article to a fluid system to cause the shape-memory article to expand and conform to a surface of the borehole; exposing the filter cake to the fluid system; and removing the filter cake with the fluid system; wherein the fluid system comprises (i) a chelating agent, (ii) an activator, (iii) a non-emulsifier, and (iv) water or a brine.

Aspect 2. The method as in any prior aspect, wherein the filter cake is a water-based filter cake.

Aspect 3. The method as in any prior aspect, wherein the filter cake is removed after the shape-memory article has expanded and conformed to the surface of the borehole.

Aspect 4. The method as in any prior aspect, wherein the filter cake is removed at least two hours after the shape-memory article has expanded and conformed to the surface of the borehole.

Aspect 5. The method as in any prior aspect, wherein the fluid system comprises, based on the total weight of the fluid system: (i) about 2 to about 40 wt. % of the chelating agent, (ii) about 1 to about 20 wt. % of the activator, (iii) about 0.01 to about 3 wt. % of the non-emulsifier, and (iv) about 30 to about 90 wt. % of the water or brine.

Aspect 6. The method as in any prior aspect, wherein the chelating agent comprises at least one of ethylenediaminetetraacetic acid or a salt thereof, (N,N-dicarboxymethyl glutamic) acid or a salt thereof, aspartic acid N,N-diacetic acid or a salt thereof, methylglycine N,N-diacetic acid or a salt thereof, etidronic acid or a salt thereof, diethylenetriamine pentaacetate or a salt thereof, hydroxyethylethylenediaminetriacetic acid or a salt thereof; N-(2-hydroxyethyl) iminodiacetic acid or a salt thereof, ethylenediamine-N,N'-disuccinic acid or a salt thereof, egtazic acid or a salt thereof, nitrilotriacetic acid or salt thereof, or cyclohexanediaminetetraacetic acid or a salt thereof.

Aspect 7. The method as in any prior aspect, wherein the chelating agent comprises at least one of sodium ethylenediaminetetraacetic acid, disodium ethylenediaminetetraacetic acid, diammonium ethylenediaminetetraacetic acid, or tetraammonium ethylenediaminetetraacetic acid, trisodium dicarboxymethyl alaninate; pentasodium diethylenetriaminepentaacetate; trisodium N-(hydroxyethyl)-ethylenediaminetriacetate.

Aspect 8. The method as in any prior aspect, where the activator comprises at least one of butanol, butoxy tri-glycol, 2-butoxyethanol, acetyl acetone, adipate, maleate, diethylene glycol monoethyl acetate, a glutamic acid derivative, an ethoxylated alcohol, a propoxylated alcohol, a glycol, an ethoxylated glycol, an ethoxylated phenol, a propoxylated alcohol, a propoxylated glycol, a propoxylated phenol, an ethoxylated and propoxylated alcohol, an ethoxylated and propoxylated glycol, an ethoxylated and propoxylated phenol, n-butyl acetate, n-butyl propionate, n-propyl propionate, n-pentyl propionate, diethylene glycol, mono ethyl ether acetate, or triethylene glycol n-butyl.

Aspect 9. The method as in any prior aspect, wherein the activator comprises butanol, isobutanol, butoxytriglycol, or a combination thereof.

Aspect 10. The method as in any prior aspect, wherein the non-emulsifier is a combination comprising two or more of the following non-emulsifier components: methanol, ethanol, isopropanol, an oxyalkylated aliphatic alcohol, an oxyalkylated alkylphenol, ethoxylated alcohol, 2-ethyl hexanol, polyethylene glycol, or an aromatic naphtha.

Aspect 11. The method as in any prior aspect, wherein the fluid system further comprises a surfactant, and the surfactant comprises at least one of a non-ionic surfactant, an anionic surfactant, a cationic surfactant, or an amphoteric surfactant.

Aspect 12. The method as in Aspect 11, wherein the surfactant is present in an amount of about 1 to about 25 wt. % based on the total weigh of the fluid system.

Aspect 13. The method as in Aspect 12, wherein the fluid system comprises about 30 to about 70 wt. % of a brine having a density of about 10 to about 17 pounds/gallon.

Aspect 14. The method as in any prior aspects 1 to 10, wherein the fluid system comprises about 30 to about 90 wt. % of a brine having a density of about 8 to about 10 pounds/gallon.

Aspect 15. The method as in any prior aspect, wherein the fluid system comprises the brine, which comprises at least a halide or formate salt of Ca, Na, K, Cs, or Zn.

Aspect 16. The method as in any prior aspect, where the fluid system further comprises a viscosifier, the viscosifier comprising at least one of a hydratable polysaccharide, xanthan gum, cellulose, a cellulose derivative, a viscoelastic surfactant, a polyacrylamide, a polyacrylate, diallyldimethylammonium chloride, a urea thixotrope, or an amide ester thixotrope.

Aspect 17. The method as in any prior aspect, where the fluid system further comprises about 1 to about 3 wt. % of a corrosion inhibitor based on the total weight of the fluid system.

Aspect 18. The method as in any prior aspect, wherein the fluid system further comprises about 5 to about 25 wt. % of an acid component comprising an acid, an acid precursor, or a combination thereof.

Aspect 19. The method as in any Aspect 18, wherein the acid component comprises at least one of acetic acid, formic acid, lactic acid, citric acid, phthalic acid, an amino acid, an ester thereof, or an inorganic acid.

Aspect 20. The method as in any prior aspect, wherein the shape-memory article has a porous structure, and the method further comprises flowing a fluid through the shape-memory article.

Aspect 21. A fluid system comprising, based on the total weight of the fluid system, (i) about 2 to about 20 wt. % of a chelating agent; (ii) about 1 to about 20 wt. % of an activator; (iii) about 0.01 to about 3 wt. % of a non-emulsifier; (iv) about 30 to about 90 wt. % of a brine; and (v) about 0.5 to about 3 wt. % of a corrosion inhibitor.

Aspect 22. The fluid system as in Aspect 21, wherein the chelating agent comprises ethylenediaminetetraacetic acid or a salt thereof; the activator comprises butanol, butoxytriglycol, or a combination thereof; and the non-emulsifier comprises three or more of the following non-emulsifier components: methanol, ethanol, isopropanol, an oxyalkylated aliphatic alcohol, an oxyalkylated alkylphenol, ethoxylated alcohol, 2-ethyl hexanol, polyethylene glycol, an aromatic naphtha, or a surfactant.

Aspect 23. A fluid system comprising, based on the total weight of the fluid system: (i) about 5 to about 25 wt. % of an acid component comprising an acid, an acid precursor, or a combination of the acid and the acid precursor, and about 10 to about 40 wt. %, preferably about 20 to about 40 wt. % of a chelating agent; (ii) about 1 to about 20 wt. % of an activator; (iii) about 0.01 to about 3 wt. % of a non-emulsifier; (iv) about 30 to about 90 wt. % of water or a brine; (v) about 0.5 to about 3 wt. % of a corrosion inhibitor.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% or 5%, or 2% of a given value.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method comprising:
   disposing a device into a borehole in proximity to a subterranean formation where a filter cake has been formed adjacent thereto, the device comprising a support structure and a shape-memory article disposed at the support structure, the shape-memory article comprising a shape-memory polymer, wherein the device is disposed when the shape-memory article is in a compacted shape;
   exposing the shape-memory article to a fluid system to cause the shape-memory article to expand and conform to a surface of the borehole;
   exposing the filter cake to the fluid system; and
   removing the filter cake with the fluid system;
   wherein the fluid system comprises
   (i) about 2 to about 40 wt. % of a chelating agent, wherein the chelating is sodium ethylenediaminetetraacetic acid, disodium ethylenediaminetetraacetic acid, diammonium ethylenediaminetetraacetic acid, tetraammonium ethylenediaminetetraacetic acid, trisodium dicarboxymethyl alaninate, pentasodium di ethylenetriaminepentaacetate, trisodium N-(hydroxyethyl)-ethylenediaminetriacetate, or a combination thereof,
   (ii) about 1 to about 20 wt. % of an activator, wherein the activator is butanol, isobutanol, butoxytriglycol, or a combination thereof, (iii) about 0.01 to about 3 wt. % of a non-emulsifier, and
(iv) about 30 to about 90 wt. % of water or a brine, and
the filter cake is removed after the shape-memory article has expanded and conformed to the surface of the borehole.

2. The method of claim 1, wherein the filter cake is a water-based filter cake.

3. The method of claim 1, wherein the filter cake is removed at least two hours after the shape-memory article has expanded and conformed to the surface of the borehole, and the fluid system removes the filter cake in about 8 hours to about 60 hours at a temperature of about 100° F. to about 200° F.

4. The method of claim 1, wherein the non-emulsifier is a combination comprising two to ten different non-emulsifier components selected from the group consisting of methanol, ethanol, isopropanol, an oxyalkylated aliphatic alcohol, an oxyalkylated alkylphenol, ethoxylated alcohol, 2-ethyl hexanol, polyethylene glycol, and an aromatic naphtha.

5. The method of claim 1, wherein the fluid system further comprises a surfactant that is compositionally different from the non-emulsifier, and the surfactant is a non-ionic surfactant, an anionic surfactant, a cationic surfactant, or an amphoteric surfactant, or a combination thereof.

6. The method of claim 5, wherein the surfactant is present in an amount of about 1 to about 25 wt. % based on the total weight of the fluid system.

7. The method of claim 6, wherein the fluid system comprises about 30 to about 70 wt. % of a brine having a density of about 10 to about 17 pounds/gallon.

8. The method of claim 1, wherein the fluid system comprises about 30 to about 90 wt. % of the brine, and the brine has a density of about 8 to about 10 pounds/gallon.

9. The method of claim 1, wherein the fluid system comprises the brine, and the brine is a halide or formate salt of Ca, Na, K, Cs, or Zn.

10. The method of claim 1, wherein the fluid system further comprises a viscosifier, and the viscosifier is a hydratable polysaccharide, xanthan gum, cellulose, a cellulose derivative, a viscoelastic surfactant, a polyacrylamide, a polyacrylate, diallyldimethylammonium chloride, a urea thixotrope, an amide ester thixotrope, or a combination thereof.

11. The method of claim 1, wherein the fluid system further comprises about 1 to about 3 wt. % of a corrosion inhibitor based on the total weight of the fluid system.

12. The method of claim 1, wherein the fluid system further comprises about 5 to about 25 wt. % of an acid component comprising an acid, an acid precursor, or a combination thereof.

13. The method of claim 12, wherein the acid component is acetic acid, formic acid, lactic acid, citric acid, phthalic acid, an amino acid, an ester thereof, an inorganic acid, or a combination thereof.

14. The method of claim 1, wherein the shape-memory article has a porous structure, and the method further comprises flowing a fluid through the shape-memory article.

15. The method of claim 1, wherein the fluid system comprises about 3 to about 12 wt % of the chelating agent and about 3 to 10 wt. % of the activator.

16. The method of claim 1, wherein the fluid system comprises about 20 to about 40 wt. % of the chelating agent, about 3 to about 10 wt. % of the activator, and about 10 to about 20 wt. % of an acid component which is an acid, an acid precursor, or a combination thereof.

17. The method of claim 16, wherein the acid component is acetic acid, formic acid, lactic acid, citric acid, phthalic acid, an amino acid, or a combination thereof.

18. The method of claim 1, wherein the non-emulsifier comprises four to ten non-emulsifier components.

* * * * *